(12) United States Patent
Liu et al.

(10) Patent No.: US 7,681,051 B2
(45) Date of Patent: Mar. 16, 2010

(54) TRANSITIONING OF A PORT IN A COMMUNICATIONS SYSTEM FROM AN ACTIVE STATE TO A STANDBY STATE

(75) Inventors: Jinsong Liu, Shanghai (CN); Qiangao Xu, Shanghai (CN); Haifeng Zhou, Shanghai (CN); Wen Zhu, Shanghai (CN)

(73) Assignee: Agere Systems Inc., Allentown, PA (US)

( * ) Notice: Subject to any disclaimer, the term of this patent is extended or adjusted under 35 U.S.C. 154(b) by 740 days.

(21) Appl. No.: 11/468,439

(22) Filed: Aug. 30, 2006

(65) Prior Publication Data

US 2008/0065916 A1 Mar. 13, 2008

(51) Int. Cl.
G06F 1/00 (2006.01)
G06F 1/26 (2006.01)
G06F 1/32 (2006.01)

(52) U.S. Cl. .................................... 713/300; 713/320
(58) Field of Classification Search ................. 713/300, 713/320
See application file for complete search history.

(56) References Cited

U.S. PATENT DOCUMENTS

| 5,919,261 | A * | 7/1999 | Aoki et al. .................. 713/300 |
| 6,021,506 | A * | 2/2000 | Cho et al. .................... 713/601 |
| 6,412,076 | B1 * | 6/2002 | Honda et al. ................. 713/323 |
| 6,523,073 | B1 * | 2/2003 | Kammer et al. ............... 710/48 |
| 6,912,596 | B2 | 6/2005 | Skidmore et al. |
| 7,036,031 | B2 * | 4/2006 | Takeuchi .................... 713/323 |
| 2005/0030808 | A1 | 2/2005 | Brown et al. |
| 2005/0066158 | A1 | 3/2005 | Mowery et al. |
| 2005/0097378 | A1 * | 5/2005 | Hwang ....................... 713/320 |
| 2006/0031836 | A1 * | 2/2006 | Brown et al. ................ 718/100 |
| 2006/0112289 | A1 | 5/2006 | Chang |
| 2007/0113111 | A1 * | 5/2007 | Dahan et al. ................ 713/300 |

OTHER PUBLICATIONS

1394b IEEE Standard for a High-Performance Serial Bus-Amendment 2., Dec. 14, 2002, IEEE, pp. 1-2,20,147-155,292.*
IEEE P1394c/D1.2 Draft Standard for a High Performance Serial Bus -Amendment 3, Jul. 23, 2006, IEEE, pp. 16 and 87.*

* cited by examiner

Primary Examiner—Mark Connolly
(74) Attorney, Agent, or Firm—Ryan, Mason & Lewis, LLP

(57) ABSTRACT

A method of transitioning a port in a communication system from an active state to a standby state includes the steps of transmitting a signal to transition the port to the standby state, and, upon transmission of the signal to transition the port to the standby state, transitioning the port from the active state into the standby state without entering a suspended state. The port may be a physical layer interface port and the communication system may be an IEEE 1394-compliant communication system.

27 Claims, 8 Drawing Sheets

| | t0 | t1 | t2 | t3 |
|---|---|---|---|---|
| port_state | p2 | | p3 | |
| rx_ok | TRUE | | FALSE | |
| signaled | FALSE | TRUE | | |
| do_standby | FALSE | | FALSE | TRUE |
| force_disconnect | FALSE | | | |

| port_state | p2 | | | p7 | |
|---|---|---|---|---|---|
| rx_ok | TRUE | | | FALSE | TRUE |
| signaled | FALSE | | TRUE | | |
| do_standby | FALSE | TRUE | | | |
| force_disconnect | FALSE | | | | |
| | t0 | t1 | t2 | t3 | |

700

800

TRANSITIONING OF A PORT IN A COMMUNICATIONS SYSTEM FROM AN ACTIVE STATE TO A STANDBY STATE

FIELD OF INVENTION

The present invention relates generally to data communications, and more particularly relates to data communications between two or more devices using a serial communications bus.

BACKGROUND OF THE INVENTION

Presently, there are various known protocols used to facilitate communications between two or more electronic devices connected together via a common bus or an alternative communications link. Among the best-known and most widely-used of these protocols are USB (Universal Serial Bus), SATA (Serial Advanced Technology Attachment), HDMI (High-Definition Multimedia Interface), Fiber Channel, and IEEE 1394.

IEEE 1394, under the trade names FireWire® (a registered trademark of Apple Computer, Inc.) and i.LINK® (a registered trademark of Sony Corporation), has become widely adopted for use in a variety of consumer, computer, and industrial electronics. It is especially well-suited for use in such applications as data storage, audio and video, networking, and bus-powered peripherals due to its support for both asynchronous and isochronous data at high data transfer rates, both peer-to-peer and master-slave configurations, both daisy-chain and hub-and-spoke arrangements, as well as its guaranteed Quality of Service (QoS), low latency, and low processing overhead.

Networks can be envisioned in layers, including, among other layers, a physical layer (PHY) and a link layer. The PHY refers to network hardware, physical cabling and/or a wireless connection. The PHY is the most basic network layer, providing only the means of transmitting the encoded output of the link layer. The PHY, which is responsible for conversion between the representation of digital data in user equipment and the corresponding signals transmitted over a communications channel, is the layer in which signaling specifications and networking rules are detailed. The link layer is the next layer up from the PHY. The link layer transfers data between adjacent nodes in a network and generally formats and/or manipulates transported data across the PHY for interfacing with an application.

The IEEE 1394 standard was initially specified by the Institute of Electrical and Electronics Engineers (IEEE) in IEEE 1394-1995, entitled *IEEE Standard for a High Performance Serial Bus*, and has been amended twice, in IEEE 1394a-2000, entitled *IEEE Standard for a High Performance Serial Bus—Amendment 1* and IEEE 1394b-2002, entitled *IEEE Standard for a High Performance Serial Bus—Amendment 2*, all of which are incorporated by reference herein.

IEEE 1394a introduced a Suspended state (defined in IEEE 1394a-2000 3.9.5.2) and a corresponding Resume state for power management. IEEE 1394b added a Standby state (defined in IEEE 1394b-2002 3.10.7.3.1) and a corresponding Restore state for devices operating in Beta mode. Both the Suspended and Standby states are not operational for normal serial bus arbitration, but are otherwise capable of detecting either a physical cable disconnection or a resume or restore signal, hence reducing power consumption while providing for continued monitoring of the physical connection.

A Standby state in IEEE 1394b has certain advantages over a Disabled or Suspended state, primarily because no bus reset is generated as a result of a port entering or leaving the Standby state. This is beneficial in that a bus reset will cause the entire bus to perform a bus initialization procedure. From the standpoint of the PHY, a bus initialization generally takes about 200 microseconds (µs) for a Beta-only bus without loops; if there is a loop (or loops) on the bus, or if the bus is a hybrid bus (i.e., an operating bus that contains at least one border node), then the bus initialization procedure can take considerably longer time. From the transaction level, a bus reset might break the traffic on the bus and clear a pending request in the PHY. Undoubtedly, frequent bus resets will significantly degrade bus performance, and thus overall system performance, and are therefore undesirable.

Unfortunately, with the current IEEE 1394b specification, a PHY port will not always transition to a Standby state as intended. Instead, the PHY port will transition to a Suspended state while its peer port transitions to a Standby state. This does not allow the two ports to be awakened by a single restore action, whereby a connection in Standby state returns to an Active state, and is thus undesirable. Moreover, a bus reset will occur when the PHY port enters into or is resumed from its Suspended state, which is undesirable.

Accordingly, there exists a need for enhancing the transition to a Standby state of the IEEE 1394b protocol or other communications protocol so as to prevent undesired transition into a suspended state rather than a standby state.

SUMMARY OF THE INVENTION

In accordance with the aforementioned need and other objectives, the present invention, in illustrative embodiments thereof, provides techniques for transitioning a port within a communication system from an active state to a standby state, without entering into a suspended state or other unintended state. In this manner, embodiments of the present invention avoid generating a bus reset when transitioning from an active state to a reduced power consumption state. In illustrative embodiments of the invention, the port may be a PHY port and the communication system may be an IEEE 1394 compliant communication system.

In accordance with one aspect of the invention, a method of transitioning a port in a communication system from an active state to a standby state includes the steps of transmitting a signal to transition the port to the standby state, and, upon transmission of the signal to transition the port to the standby state, transitioning the port from the active state into the standby state without entering a suspended state. The port may be a physical layer interface port and the communication system may be an IEEE 1394-compliant communication system.

In accordance with another aspect of the invention, a device for use in a communication system includes at least a first port, memory and at least one processor coupled to the memory and to the first port. The processor is configured to cause the first port to transmit a signal to transition at least a second port to a standby state from an active state, and, upon transmission of the signal to transition the second port from the active state to the standby state, to transition the first port from the active state to the standby state without entering a suspended state.

A data communication system according to another aspect of the invention includes at least one port adapted transmitting data to at least one other port and/or receiving data from the other port. The data communication system further includes at least one controller coupled to the port, the controller being operative to transition the port to the standby state without entering a suspended state.

These and other features and advantages of the present invention will become apparent from the following detailed description of illustrative embodiments thereof which is to read in connection with the accompanying drawings.

BRIEF DESCRIPTION OF THE DRAWINGS

FIG. 2 is an exemplary state transition diagram illustrating at least a portion of a port connection manager state machine implemented in accordance with a conventional IEEE-1394b communications protocol.

FIG. 3 is an exemplary timing diagram depicting simulated signals involved in transitioning a port from an active state to a standby state, according to the conventional IEEE-1394b communications standard.

FIG. 5 is an exemplary timing diagram depicting simulated signals involved in transitioning an IEEE 1394b node from an active state to a standby state, in accordance with an embodiment of the present invention.

DETAILED DESCRIPTION OF THE INVENTION

The present invention will be described herein in the context of an exemplary method and apparatus for transitioning a communication system port and a peer port, connected together on common communications bus, from an active state to a standby state. Illustrative embodiments of the invention facilitate the transition of a port and its peer port from Active state to Standby state without entering into a Suspended state, and thereby avoid generating a bus reset, regardless of the bus speed and/or operating mode employed.

While the present invention is described herein in conjunction with a physical layer interface port, it is to be appreciated that techniques of the present invention may be similarly applied to other ports which support a standby or alternative power conservation state, with or without modifications thereto, as will become apparent to those skilled in the art in view of the teachings herein. While the present invention is described herein in conjunction with an IEEE-1394 compliant standard, it is to be appreciated that techniques of the present invention may be similarly applied to other communication standards and/or nonstandard protocols which incorporate a standby or alternative power conservation state, with or without modifications thereto, as will become apparent to those skilled in the art in view of the teachings herein. Although certain terms may be used in conjunction with the IEEE 1394b standard, the same and/or alternative functional language may be similarly applied to other communication protocols to which techniques of the present invention may be applied. Likewise, certain names of variables, functions, constants, signals, states, etc., used herein are those specified by the IEEE 1394b standard. It will be apparent to persons having ordinary skill in the art that the specific names, internal structure, and means of implementation may be altered without significantly altering the functionality of the present invention.

In general, variables defined within the specification are assumed to act as Boolean variables unless specified otherwise. When a variable is TRUE, the conditions of the variable have been satisfied. Similarly, when a variable is FALSE, one or more conditions of the variable have not been satisfied. The symbol "!" as used herein represents a logical complement of the variable corresponding thereto, while the symbols "&&" and "||" represent logical AND and logical OR operators, respectively.

Figure 1:
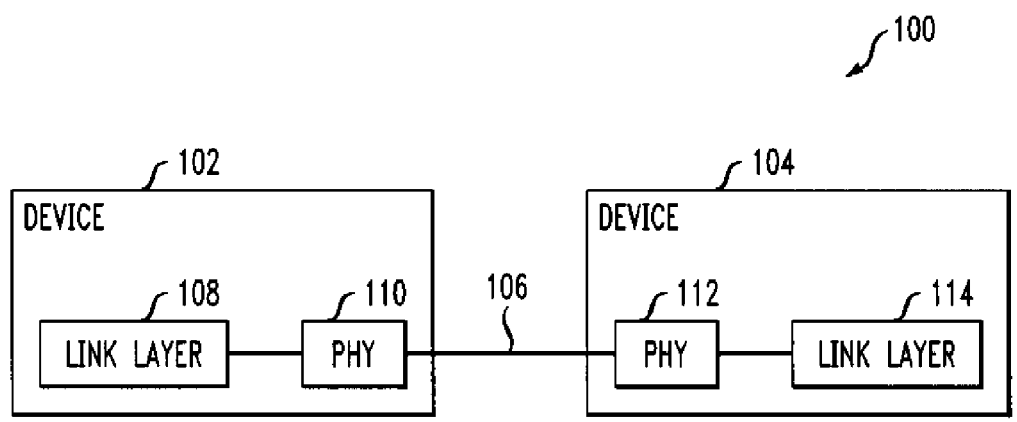
FIG. 1 is a block diagram illustrating an exemplary two-device communication system in which techniques of the present invention are implemented.

FIG. 1 is a block diagram illustrating an exemplary two-device data communication system 100 in which techniques of the present invention are implemented. The communication may be implemented, for example, as a video editing system, a multimedia broadcast system, a networking system, etc. The communication system 100 comprises a first device 102 and a second device 104 interconnected by a communication link 106. While only two devices are illustrated for ease of explanation, it is to be understood that the invention is not limited to any particular number of interconnected devices. Communication link 106 may include a wireless communication link, such as, for example, cellular, radio frequency (RF), infrared (IR), microwave, satellite, etc., and may also include a dedicated communication line, such as, for example, telephone, cable, fiber optic, etc. Communication link 106 may carry a number of channels over which data can be transferred between first and second devices 102, 104. A channel may have a certain data rate associated therewith which determines how many samples per second can be transmitted on that particular media. Lower rate channels can be aggregated into a single higher rate channel by using, for example, multiplexers, as understood by those skilled in the art. Likewise, lower rate channels can be extracted from a higher rate channel by using, for example, demultiplexers.

First and second devices 102, 104 may comprise, for example, any of a number of consumer electronics devices, including but not limited to a digital camera, digital camcorder, personal digital assistant (PDA), Moving Picture Experts Group Layer-3 audio (MP3) device, cellular phone, etc., computer peripheral devices, including but not limited to a personal computer, printer, frame grabber, external hard drive, scanner, networking hub, etc. Within the first device 102 is a link layer 108 that receives data from circuitry within the first device 102 and transfers the data to a PHY port 110 within the first device 102. The PHY port 110 codes the data into an appropriate communication protocol for transmission over communication link 106. A peer PHY port 112 within the second device 104 receives the data transmitted by the PHY port 110 in the first device 102. The peer PHY port 112 then decodes the received data and provides such decoded data to a link layer 114 within the second device 104 for controlling the second device 104 in accordance with the decoded data.

It is assumed, for the illustrative embodiments shown herein, that devices 102 and 104 communicate with one another using an IEEE 1394b communication protocol, although the invention is not limited to this communication protocol or to any standard or non-standard communication protocols. While reference may be made to the transfer of data from the first device 102 to the second device 104, data can be similarly transferred from the second device 104 to the first device 102, so that the transfer of data between the two devices is bidirectional.

Since illustrative embodiments of the present invention described herein are directed to enhancing a standby feature of a serial communications protocol, namely, an IEEE 1394b standard, of primary relevance to the present invention is the transition of the PHY ports 110 and 112 in the first and second devices 102 and 104, respectively, from an Active state, wherein a port is enabled, is capable of detecting all serial bus signal states and is participating in normal bus activity (e.g., reset, tree identify, self-identify, and normal arbitration phases), directly to a Standby state. Standby is a term which may be used to describe a low power consumption mode of operation for a given port or ports. In accordance with the IEEE 1394b standard, Standby is a feature of Beta-mode operation only. If a node has only one active port, then the connection on this port can be placed into Standby. While the connection is in Standby, the node does not participate in normal bus activity, and other nodes on the same bus are not aware of any change in status of the node placed in Standby. In contrast to a Suspended mode of operation of the connection, a bus reset does not occur as part of a node entering Standby or restoring the node from Standby, as previously explained.

The PHY port 112 in the second device 104 may be considered a peer PHY with respect to the PHY port 110 in the first device 102. The term "nephew" may be used herein to define a leaf node that has one port in the Standby state and all other ports (if any) disabled, disconnected or suspended. A root node, a node with more than one active port, or a node having another port already in Standby state cannot become a nephew. The active node connected to a nephew node may be referred to as an "uncle" node. A node becomes a nephew when it detects a standby command packet containing its node identification (ID) and port address. Although a nephew node does not participate in normal bus activity, the active bus, of which the nephew node is a member, is generally not aware of a change in status of a node as it becomes a nephew (e.g., a bus reset does not occur). If a bus reset occurs while a nephew node has a port in Standby, then the peer uncle node proxies self-ID packets (e.g., PHY packets transmitted by a cable PHY during a self-identify phase or in response to a PHY ping packet) on behalf of the nephew node.

Figure 2:
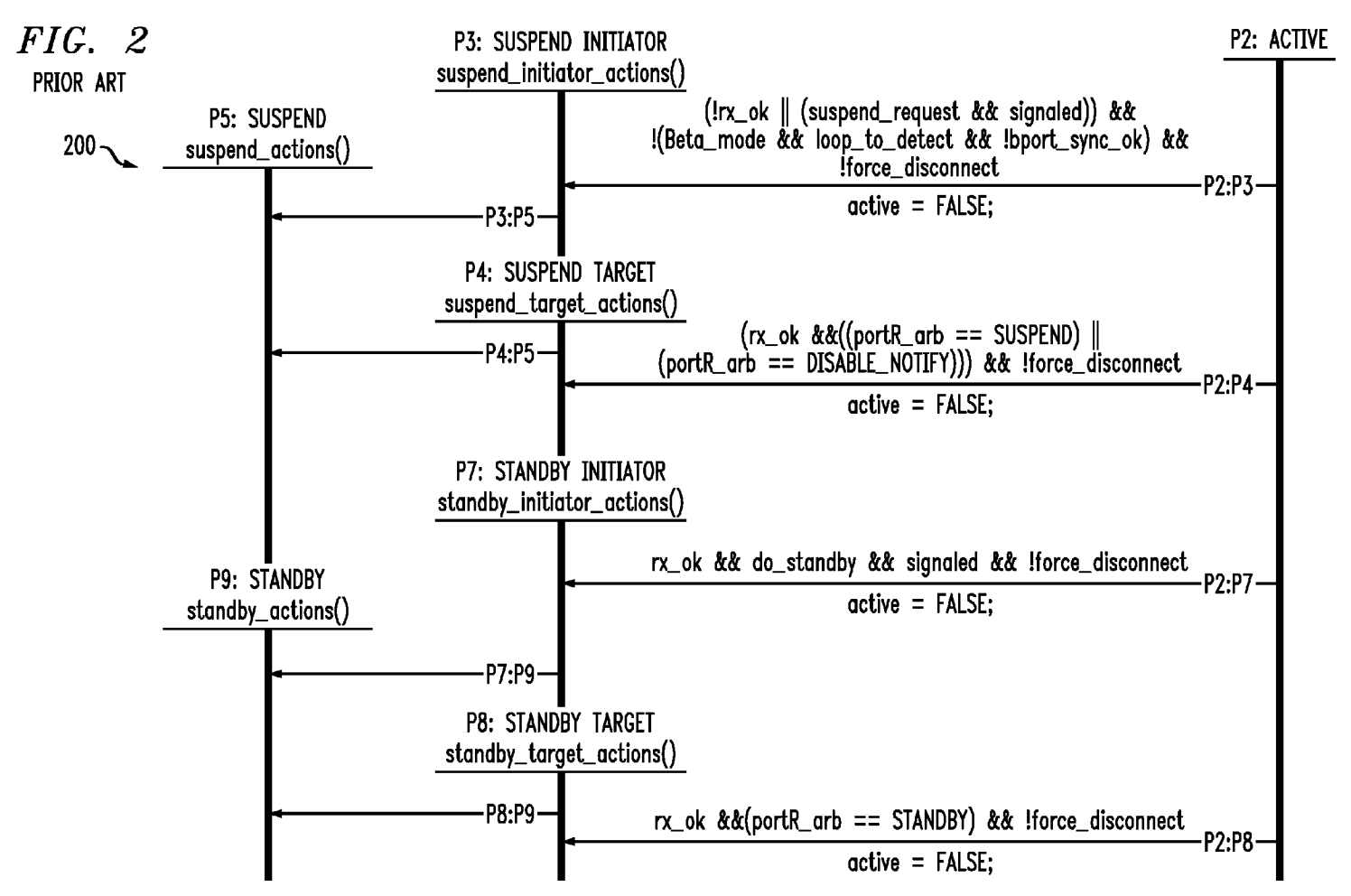

FIG. 2 is a state transition diagram 200 illustrating at least a portion of a port connection manager state machine implemented in accordance with a conventional IEEE-1394b communications protocol. The arrows represent transitions between states; the text above each arrow indicates conditions which are necessary and sufficient for that transition to occur. The vertical lines and accompanying labels represent states, and the functions which are called upon entry to the states. The port connection manager state machine included in the IEEE 1394b specification defines 13 states, including, Disconnected (P0), Resuming (P1), Active (P2), Suspend Initiator (P3), Suspend Target (P4), Suspended (P5), Disabled (P6), Standby Initiator (P7), Standby Target (P8), Standby (P9), Restoring (P10), Untested (P11), and Loop Disabled (P12). However, diagram 200 depicts only the transitions to which illustrative embodiments of the invention are preferably directed, namely those transitions between one or more of the Active, Standby Initiator, Standby Target, Standby, Suspend Initiator, Suspend Target and Suspended states (e.g., P2:P7, P2:P8, P2:P3, P2:P4).

A port will transition from an Active state (P2) to a Standby Initiator state (P7) (e.g., a P2:P7 transition) in accordance with a standard IEEE 1394b protocol as illustrated in FIG. 2, if and only if, inter alia, the variables "rx_ok," "do_standby," and "signaled," or functional equivalents thereof, are all TRUE. Likewise, a port will transition from an Active State (P2) to a Suspend Initiator state (P3) (e.g., a P2:P3 transition) in accordance with a standard IEEE 1394b protocol as illustrated in FIG. 2, if and only if, inter alia, the variable "rx_ok" is FALSE or the variables "suspend_request" and "signaled" are both TRUE.

Appendix 1 below shows exemplary source code in the C programming language which may be used by a PHY port 110. This illustrative example is a "start_tx_packet( )" function from the IEEE 1394b standard, with comments omitted and replaced. In order to initiate the process of entering the Standby state, a PHY port would call this function, which would then send a "STANDBY" signal (here, in the line of code labeled "STANDBY"), wait for a prescribed period of time (wait time), and then set the "signaled" variable TRUE (here, in the line of code labeled "SIGNALED"). The length of this wait time will vary depending on the connection speed and other settings; it will be longest (e.g., approximately 320 nanoseconds (ns)) if the bus is a hybrid bus, meaning that the bus includes both legacy (IEEE 1394 and/or IEEE 1394a) and IEEE 1394b nodes. Table 1 has each line of the exemplary code that serves to implement this wait time labeled with the portion of the wait time that the particular line is responsible for, in nanoseconds, in the case of a hybrid bus. These wait times (e.g., 80 ns, 20 ns, 40 ns, 20 ns, and 160 ns) total 320 ns, which is the approximate timeout period for a hybrid bus.

Upon receipt of a "STANDBY" signal, its peer port 112, in accordance with the state diagram shown in FIG. 2, will transition from an Active state (P2) to a Standby Target state (P8) and thus execute a "standby_target_actions( )" function, which in turn will call an "activate_connect_detect(RECEIVE_OK_HANSHAKE)" function. The latter function will set "bport_sync_ok" (which is equivalent to "rx_ok" for a Beta port, as indicated in the function "receive_ok_monitor ( )") to FALSE for the PHY's port. If this occurs within the aforementioned timeout period, "rx_ok" will be FALSE before "signaled" is TRUE. Accordingly, the PHY port 110 will transition from an Active state (P2) to a Suspend Initiator state (P3), because "rx_ok" is FALSE, rather than to a Standby Initiator state (P7), because "signaled" does not become TRUE until after "rx_ok" is no longer TRUE.

Figure 3:
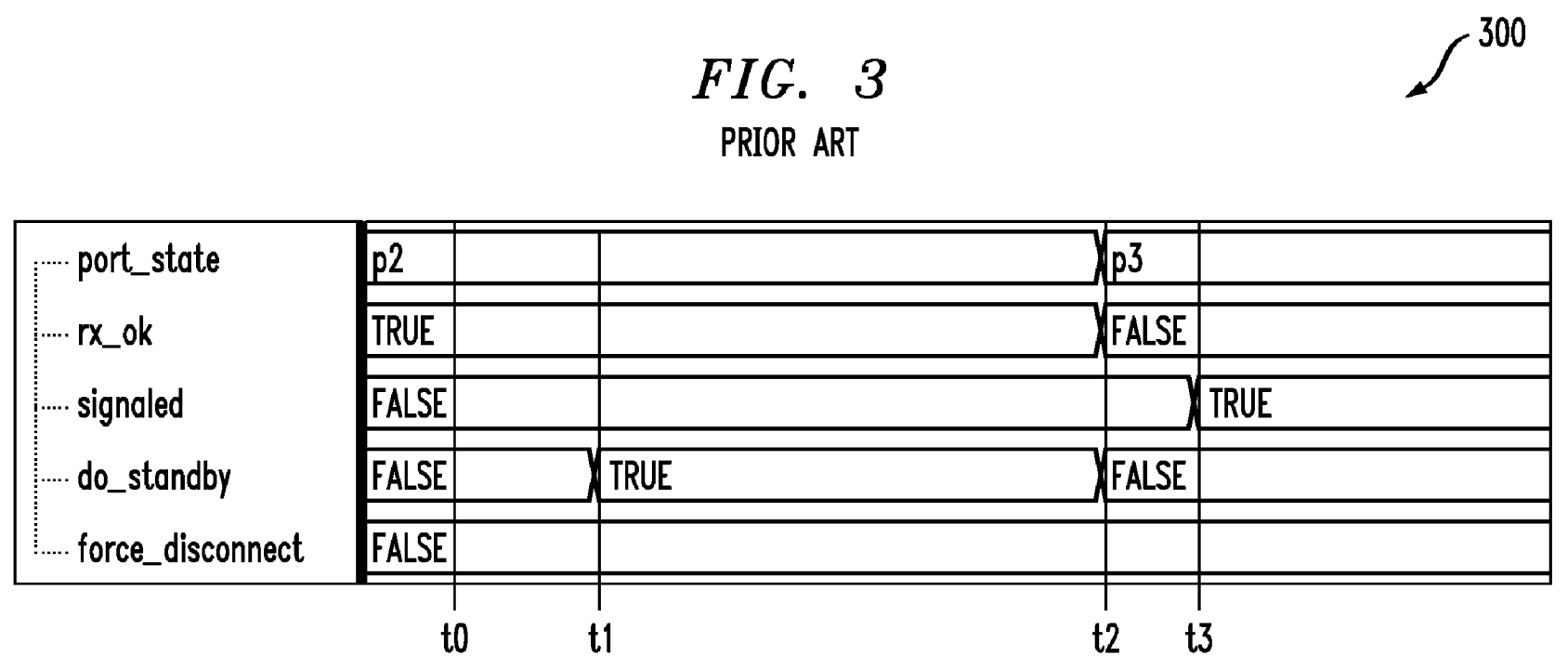

FIG. 3 is an exemplary timing diagram 300 depicting simulated signals involved in transitioning a PHY node from an Active state to a Standby state, according to the conventional IEEE 1394b communications protocol. As apparent from the figure, PHY port 110 (see FIG. 1) transitions to the Suspend Initiator state (P3) rather than transitioning to the intended Standby Initiator state (P7) under the conventional IEEE 1394b protocol. At time t0, variable "rx_ok" is TRUE, variable "signaled" is FALSE, variable "do_standby" is FALSE, variable "force_disconnect" is FALSE, and "port_state" is P2 indicating that the port is in the Active state. At time t11 "do_standby" is TRUE, indicating a request for the port to transition to Standby Initiator state (P7). After a wait time (e.g., 320 ns), since "signaled" remains FALSE, "do_standby" becomes FALSE, "rx_ok" becomes FALSE, and "port_state" is P3, indicating that the port has transitioned to Suspend Initiator state rather than Standby Initiator state as intended. At time t3, "signaled" becomes TRUE, but at this point the port has already transitioned into the Suspend Initiator state. Thus, under these circumstances, the port will not transition to the Standby Initiator state as intended. Instead, the port will transition to the Suspend Initiator state, and eventually to the Suspended state, thereby undesirably generating a bus reset when entering and leaving the Suspended state.

An aspect of the present invention avoids transitioning PHY port 110 to a Suspend Initiator state when a Standby state is requested, and thereby advantageously corrects an inherent defect in the conventional IEEE 1394b protocol. In order to correct this problem, in accordance with another aspect of the invention, the transition from an Active State (P2) to a Suspend Initiator state (P3) transition is modified to ignore loss of "rx_ok" when "do_standby" is TRUE. In other words, "rx_ok" being FALSE should not trigger the transition unless "do_standby" is also FALSE. In one embodiment, the P2:P3 transition is changed from that in the IEEE 1394b specification, namely:

---

(!rx_ok || (suspend_request && signaled)) &&
!(Beta_mode && loop_to_detect &&
!bport_sync_ok) && !force_disconnect
to
((!do_standby && !rx_ok) || (suspend_request && signaled)) &&
!(Beta_mode && loop_to_detect &&
!bport_sync_ok) && !force_disconnect).

---

Another aspect of the present invention alters the transition from Active state (P2) to Standby Initiator state (P7) such that it no longer requires that "rx_ok" be TRUE. This modification permits the port to transition from P2 to P7 as soon as "signaled" is asserted and before "rx_ok" is asserted. In one embodiment, the P2:P7 transition is changed from that in the IEEE 1394b specification, namely:

--- rx_ok && do_standby && signaled && !force_disconnect
to
do_standby && signaled && !force_disconnect.

---

An embodiment of this invention may implement either of the above aspects independently of the other. However, a preferred embodiment includes both of these aspects.

Figure 4:
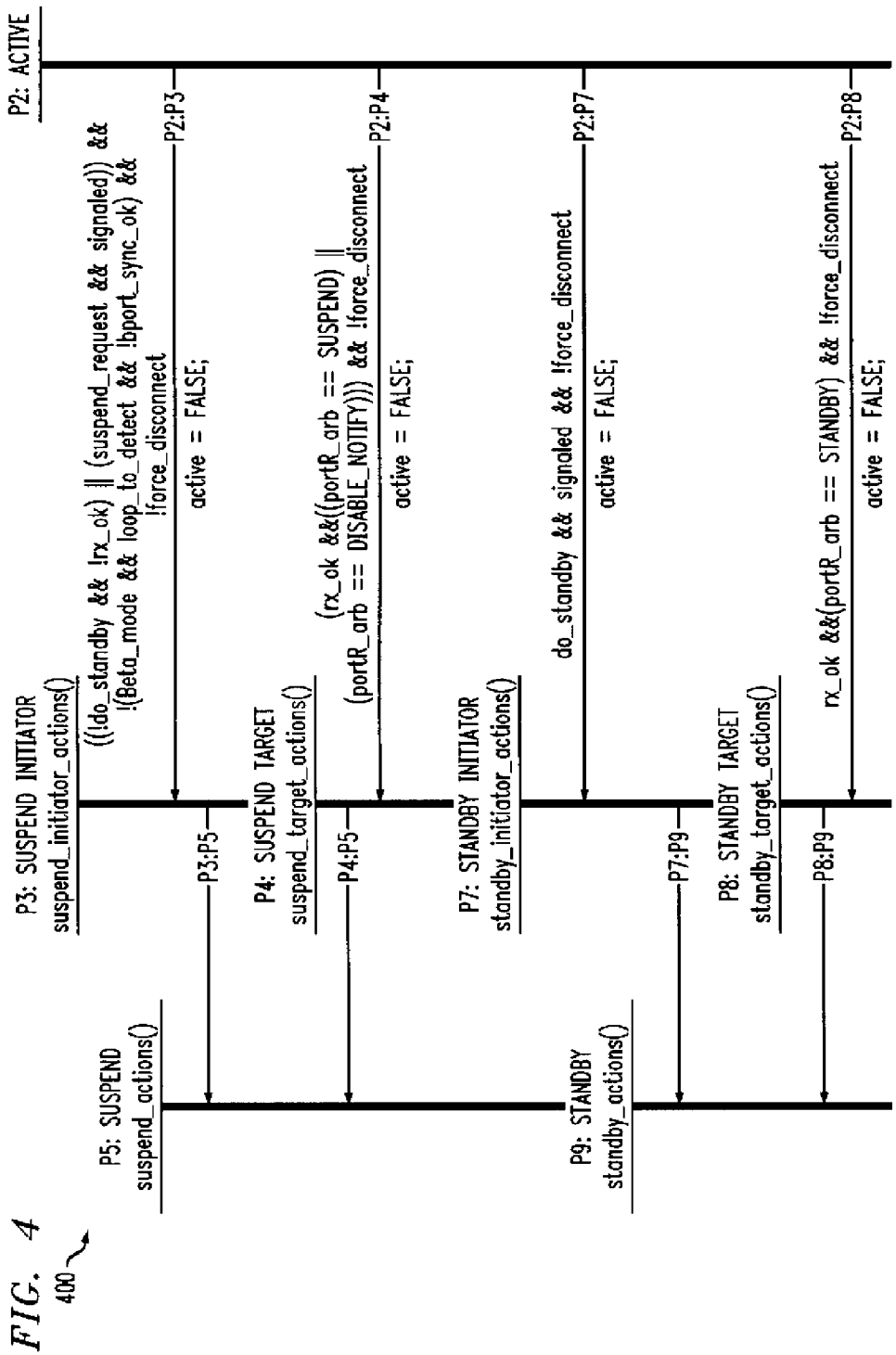
FIG. 4 is an exemplary state transition diagram illustrating at least a portion of an IEEE 1394b port connection manager state machine, in accordance with an embodiment of the present invention.

With reference to FIG. 4, there is shown an exemplary state transition diagram 400 illustrating at least a portion of an IEEE 1394b port connection manager state machine, in accordance with an embodiment of the invention incorporating both of the above mentioned aspects. As in state transition diagram 200 depicted in FIG. 2, the illustrative state transition diagram 400 depicts transitions between an Active state (P2) and one or more of Suspend Initiator (P3), Suspend Target (P4), Suspended (P5), Standby Initiator (P7), Standby Target (P8) and Standby (P9) states. As is apparent from the figure, certain state transitions have been modified compared to the state transition diagram 200 depicted in FIG. 2.

FIG. 5 is an exemplary timing diagram 500 depicting simulated signals involved in transitioning a PHY node from an Active state to a Standby state, according to an embodiment of the invention. As apparent from the figure, timing diagram 500 simulates how PHY port 110 (see FIG. 1) transitions to the intended Standby Initiator state rather than the Suspend Initiator state. At time t0, variable "rx_ok" is TRUE, variable "signaled" is FALSE, variable "do_standby" is FALSE, variable "force_disconnect" is FALSE, and "port_state" is P2 indicating that the port is in the Active state. At time t1, "do_standby" is TRUE, indicating a request for the port to transition to Standby Initiator state (P7). At time t2, "rx_ok" becomes FALSE; however, due to the implementation of an aspect of the invention, this no longer causes a transition to the Suspend Initiator state. At time t3, "signaled" becomes TRUE and the "port_state" becomes P7, indicating that the port has transitioned into the Standby Initiator state. This transition occurs as soon as "signaled" becomes TRUE even though "rx_ok" is FALSE due to the implementation of an aspect of the invention. Thus, this embodiment of the invention corrects the problem inherent in the original IEEE 1394b protocol.

It should be noted that this invention is not limited to the starting and ending transitions described above. For example, it may be desirable to implement one or more aspects of the invention with regard to a state machine which has already been altered in accordance with Clause 4.25 of the IEEE 1394 Trade Association's Technical Bulletin TB2002001, entitled 1394b *Clarifications and Errata*, hereinafter referred to as "Erratum 4.25." Erratum 4.25 suggests modifying the P2:P3 transition to ignore the negation of "rx_ok" in order to ensure that a device will transition from an Active state (P2) into a Disabled state (P6) rather than into a Suspend Initiator state (P3).

Figure 6:
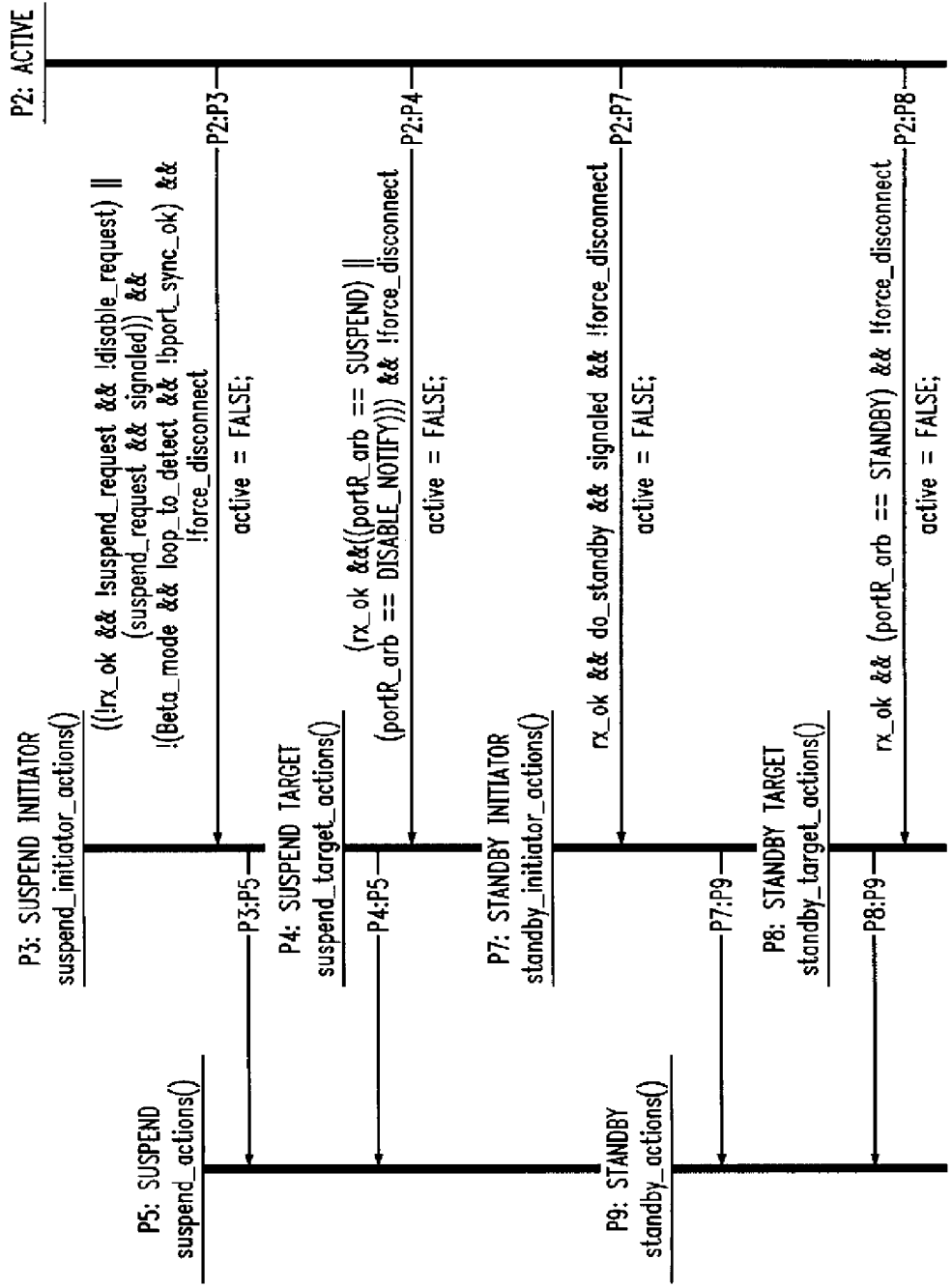
FIG. 6 is an exemplary state transition diagram illustrating at least a portion of an IEEE 1394b port connection manager state machine, in accordance with another embodiment of the present invention.

FIG. 6 shows an exemplary state transition diagram 600 illustrating at least a portion of an IEEE 1394b port connection manager state machine in which the P2:P3 transition has been modified in accordance with Erratum 4.25. As in state transition diagram 200 depicted in FIG. 2, the illustrative state transition diagram 600 depicts transitions between an Active state (P2) and one or more of Suspend Initiator (P3), Suspend Target (P4), Suspended (P5), Standby Initiator (P7), Standby Target (P8) and Standby (P9) states. Specifically, as apparent from the figure, the P2:P3 transition has been modified from

---

(!rx_ok || (suspend_request && signaled)) &&
!(Beta_mode && loop_to_detect && !bport_sync_ok) &&
!force_disconnect
to
((!rx_ok && !suspend_request && !disable_request) ||
(suspend_request && signaled)) &&
!(Beta_mode && loop_to_detect && !bport_sync_ok) &&
!force_disconnect ,

--- in accordance with an aspect of the invention.

Figure 7:
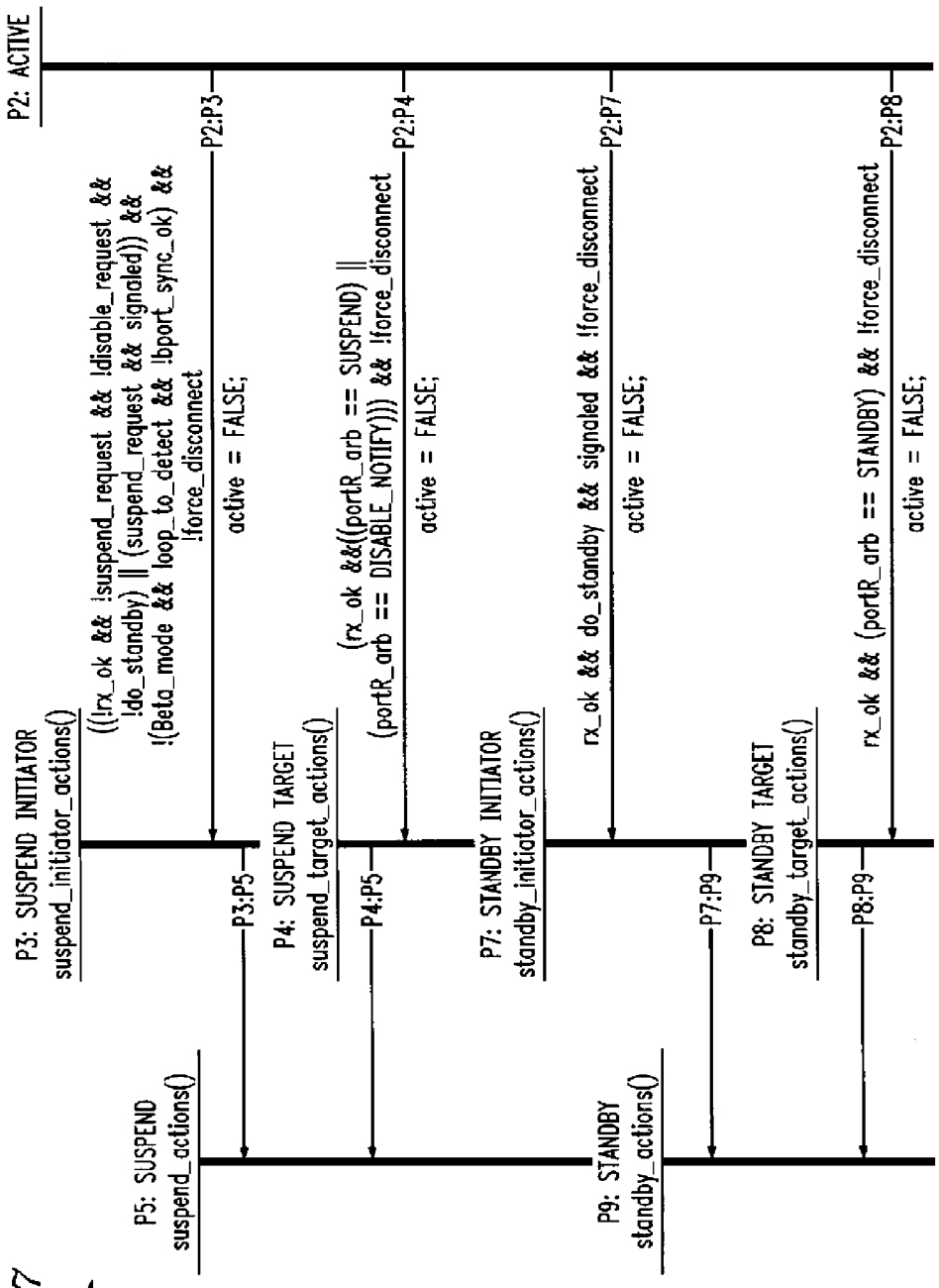
FIG. 7 is an exemplary state transition diagram illustrating at least a portion of an IEEE 1394b port connection manager state machine, in accordance with an embodiment of the present invention.

FIG. 7 depicts an exemplary state transition diagram 700 illustrating at least a portion of an IEEE 1394b port connection manager state machine, in which the P2:P3 transition has been modified in accordance with Erratum 4.25 and in accordance with at least one aspect of the invention. As in state transition diagram 200 depicted in FIG. 2, the illustrative state transition diagram 700 depicts transitions between an Active state (P2) and one or more of Suspend Initiator (P3), Suspend Target (P4), Suspended (P5), Standby Initiator (P7), Standby Target (P8) and Standby (P9) states. Specifically, as apparent from the figure, the P2:P3 transition has been modified from

---

(!rx_ok || (suspend_request && signaled)) &&
!(Beta_mode && loop_to_detect && !bport_sync_ok) &&
!force_disconnect
to
((!rx_ok && !suspend_request && !disable_request && !do_standby) ||
(suspend_request && signaled)) &&
!(Beta_mode && loop_to_detect && !bport_sync_ok) &&
!force_disconnect ,

--- in accordance with an aspect of the invention.

Figure 8:
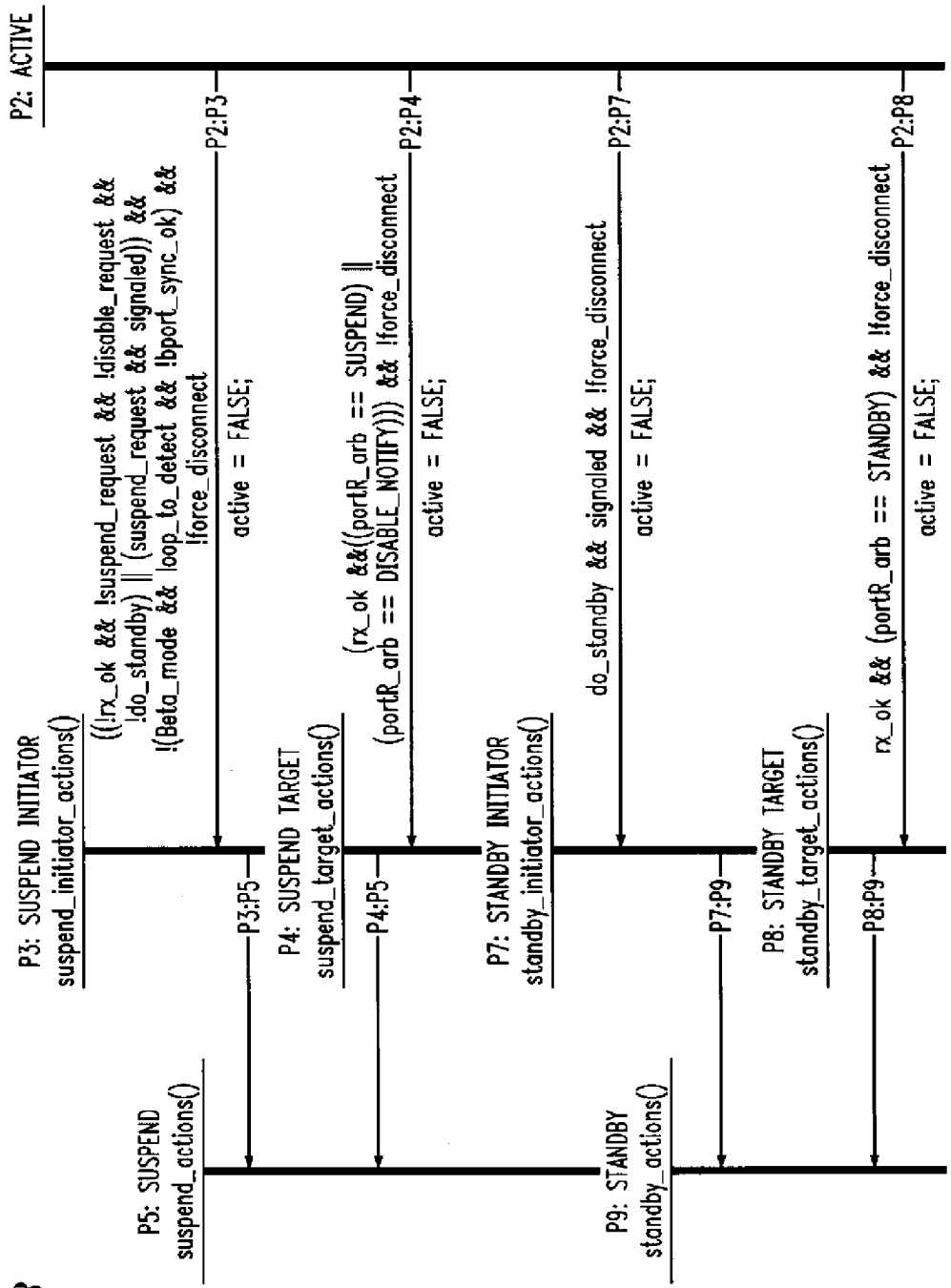
FIG. 8 is an exemplary state transition diagram illustrating at least a portion of an IEEE 1394b port connection manager state machine, in accordance with another embodiment of the present invention.

FIG. 8 shows an exemplary state transition diagram 800 illustrating at least a portion of an IEEE 1394b port connection manager state machine, in which the P2:P3 transition has been modified in accordance with Erratum 4.25 and in accordance with at least one aspect of the invention, and in which the P2:P7 transition has been modified in accordance with another aspect of the invention. As in state transition diagram 200 depicted in FIG. 2, the illustrative state transition diagram 800 depicts transitions between an Active state (P2) and one or more of Suspend Initiator (P3), Suspend Target (P4), Suspended (P5), Standby Initiator (P7), Standby Target (P8) and Standby (P9) states. Specifically, as apparent from the figure, the P2:P3 transition has been modified from

```
(!rx_ok || (suspend_request && signaled)) &&
!(Beta_mode && loop_to_detect && !bport_sync_ok) &&
!force_disconnect
to
((!rx_ok && !suspend_request && !disable_request && !do_standby) ||
(suspend_request && signaled)) &&
!(Beta_mode && loop_to_detect && !bport_sync_ok) &&
!force_disconnect ,
``` and the P2:P7 transition has been modified from

```
rx_ok && do_standby && signaled && !force_disconnect
to
do_standby && signaled && !force_disconnect,
``` in accordance with an aspect of the invention.

By way of example only, Erratum 4.25 may be implemented on a standard IEEE 1394b port by altering a relevant portion of a port connection manager state machine from that depicted in state transition diagram 200 shown in FIG. 2 to that depicted in state transition 600 shown in FIG. 6, and then implement one or more aspects of the present invention by altering a relevant portion of a port connection manager state machine from that depicted in state transition diagram 600 shown in FIG. 6 to that depicted in state transition diagram 800 shown in FIG. 8. As another example, one could implement one aspect of the present invention on an IEEE 1394b port which has already been modified in accordance with Erratum 4.25 by altering a relevant portion of a port connection manager state machine from that depicted in state transition diagram 600 shown in FIG. 6 to that depicted in state transition diagram 700 shown in FIG. 7, and then implement another aspect of the present invention by altering a relevant portion of a port connection manager state machine from that depicted in state transition diagram 700 shown in FIG. 7 to that depicted in state transition diagram 800 shown in FIG. 8. One could also implement both Erratum 4.25 and an aspect (or aspects) of the present invention on a standard IEEE 1394b port by altering a relevant portion of a port connection manager state machine from that depicted in state transition diagram 200 shown in FIG. 2 to that depicted in state transition diagram 600 shown in FIG. 6, and then implement another aspect of the present invention by altering a relevant portion of a port connection manager state machine from that depicted in state transition diagram 600 shown in FIG. 6 to that depicted in state transition 800 shown in FIG. 8.

A preferred embodiment with regard to a standard IEEE 1394b port would be to alter its port connection manager state machine from that depicted in state transition diagram 200 shown in FIG. 2 to that depicted in state transition diagram 800 shown in FIG. 8, so as to implement the beneficial modifications set forth in both Erratum 4.25 and in illustrative embodiments of the present invention.

With reference again to FIG. 1, methodologies of embodiments of the present invention may be implemented in one or more of devices 102 and 104. For example, device 102 may include a processor, memory coupled to the processor (e.g., via a bus or alternative connection means), as well as input/output (I/O) circuitry operative to interface with the processor. The processor may be configured to perform at least a portion of the methodologies of the present invention.

It is to be appreciated that the term "processor" as used herein is intended to include any processing device, such as, for example, one that includes a central processing unit (CPU) and/or other processing circuitry (e.g., network processor, digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

Accordingly, an application program, or software components thereof including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor. In any case, it is to be appreciated that at least a portion of the components shown in FIG. 1 may be implemented in various forms of hardware, software, or combinations thereof (e.g., one or more DSPs with associated memory, application-specific integrated circuit(s), functional circuitry, one or more operatively programmed general purpose digital computers with associated memory, etc). Given the teachings of the invention provided herein, one of ordinary skill in the art will be able to contemplate other implementations of the components of the invention.

At least a portion of the techniques of the present invention may be implemented in an integrated circuit. In forming integrated circuits, a plurality of identical dice is typically fabricated in a repeated pattern on a surface of a semiconductor wafer. Each die includes a device described herein, and may include other structures or circuits. The individual dice are cut or diced from the wafer, then packaged as an integrated circuit. One skilled in the art would know how to dice wafers and package dice to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

APPENDIX 1

```
void start_tx_packet(speedCode pkt_speed, pktType pkt, boolean send_cycle_start) {
  int signal_port = NPORT, i;
  int deletable_symbol_time;
  if (!DS_stuck) {
    max_beta_timer = 0;
    DS_stuck = TRUE;
  }
  cur_speed = pkt_speed;
  cur_format = pkt;
  legacy_phase_expected = FALSE;
  non_null_packet = FALSE;
  data_null_packet = FALSE;
  if (send_cycle_start) {
    if (link == B_Link)
      PH_DATA_indication(odd_isoch_phase ? PH_ISOCH_ODD: PH_ISOCH_EVEN, 0, 0, 0);
    for (i = 0; i < NPORT; i++)
      if (!Beta_mode[i]) portTarb(i, DATA_PREFIX);
    send_control(odd_isoch_phase ? CYCLE_START_ODD: CYCLE_START_EVEN, NPORT);
    iso_cycle = TRUE;
  }
  for (i = 0; i < NPORT; i++) {
    if (active[i]) {
      if (disable_request[i] && !phy_response)
        portTarb(signal_port = i, DISABLE_NOTIFY);
      else if (suspend_request[i] && !phy_response)
        portTarb(signal_port = i, SUSPEND);
      else if (do_standby[i] && !phy_response)
        portTarb(signal_port = i, STANDBY);                                           // STANDBY
    }
  }
  if ((signal_port != NPORT) && (cur_speed > min_operating_speed))
    cur_speed = min_operating_speed;
  for (i = 0; i < NPORT; i++) {
    if (!active[i])
      speed_OK[i] = FALSE;
    else if (!(disable_request[i] || suspend_request[i] || do_standby[i]) || phy_response) {
      speed_OK[i] = (cur_speed <= port_speed[i]) && (Beta_mode[i] || pkt == LEGACY);
      if {(pkt == LEGACY) && (link == Legacy_Link) && (cur_speed == S100))
        portTarb(i, DATA_PREFIX);
      else if (speed_OK[i]) {
        portTspeed(i, cur_speed, pkt);
      } else portTarb(i, pkt == LEGACY ? DATA_PREFIX : DATA_NULL);
    }
  }
  wait_symbol_time(cur_speed);                                                         // 80ns
  for (i = 0; i < NPORT; i++)
    if (!(disable_request[i] || suspend_request[i] || do_standby[i]) || phy_response)
      if (Beta_mode[i]) portTarb(i, speed_OK[i] || pkt == LEGACY ? DATA_PREFIX : DATA_NULL);
  deletable_symbol_time = MIN_DELETABLE_SYMBOL_TIME;
  if ((cur_speed < S800) && (Legacy_symbol_count(cur_speed) * 2 > MIN_DELETABLE_SYMBOL_TIME))
    deletable_symbol_time = Legacy_symbol_count(cur_speed) * 2;
  if (pkt == LEGACY) {
    wait_Legacy_time(SPEED_SIGNAL_LENGTH - Legacy_symbol_count(cur_speed));            // 20ns
    for (i = 0; i < NPORT; 1++)
      if (!(disable_request[i] || suspend_request[i] || do_standby[i]) || phy_response)
        portTarb(i, speed_OK[i] || pkt == LEGACY ? DATA_PREFIX : DATA_NULL);
    wait_Legacy_time(DATA_PREFIX_HOLD);                                                // 40ns
    if (cur_speed == S100)
      wait_Legacy_time (2*Legacy_symbol_count(S100) -                                  // 20ns
        (SPEED_SIGNAL_LENGTH+DATA_PREFIX_HOLD));
  } else wait_symbol_time(cur_speed);
  wait_Lagacy_time (deletable_symbol_time);                                            // 160ns
  if (signal_port != NPORT) {
    for (i = 0; i < NPORT; i++)
      if ((disable_request [i] || suspend_request[i] || do_standby[i]) && !phy_response)
        portTarb(i, IDLE);
  }
  signaled = (signal_pore != NPORT);                                                   // SIGNALED
  if (signal_port != NPORT) {
    for (i = 0; i < NPORT; i++)
      if ((disable_request[i] || suspend_request[i] || do_standby[i]) && !phy_response)
        while (active[i])
          ;
  }
}
```

What is claimed is:

1. A method of transitioning a port in a communication system from an active state to a standby state, the method comprising the steps of:
   transmitting a signal to transition the port to the standby state; and
   upon transmission of the signal to transition the port to the standby state, ensuring that the port transitions from the active state to the standby state without entering a suspended state.

2. The method of claim 1, wherein the port comprises a physical layer interface port.

3. The method of claim 1, further comprising the steps of:
   activating an indicator when the signal to transition the port to the standby state is transmitted; and
   ensuring that the suspended state is not entered from the active state when the indicator is active.

4. The method of claim 1, further comprising the step of entering the standby state upon deactivation of a first indicator when a second indicator is active.

5. The method of claim 4, wherein activation of the first indicator indicates that the signal to transition the port to the standby state has been transmitted.

6. The method of claim 1, further comprising the step of entering the standby state immediately upon activation of a first indicator regardless of a status of a second indicator.

7. The method of claim 6, wherein activation of the second indicator indicates that the port is ready to receive data.

8. The method of claim 6, wherein activation of the first indicator indicates that the signal to transition the port to the standby state has been transmitted.

9. The method of claim 1, wherein the communication system is an IEEE 1394 compliant communication system.

10. A method of transitioning a port in a communication system from an active state to a standby state, the method comprising the steps of:
    transmitting a signal to transition the port to the standby state;
    upon transmission of the signal to transition the port to the standby state, transitioning the port from the active state to the standby state without entering a suspended state; and
    ensuring that the suspended state is not entered when a first variable "rx_ok" is FALSE except when a second variable "do_standby" is also FALSE.

11. The method of claim 10, wherein the ensuring step comprises the step of modifying a logical expression governing a transition of the active state to the suspended state in a port connection state machine.

12. The method of claim 11, wherein the modifying step comprises removing, as a condition in the logical expression governing the transition of the port from the active state to the suspended state in the port connection state machine, an evaluation of a variable "rx_ok."

13. The method of claim 10, wherein the ensuring step comprises the step of modifying a logical expression governing a transition of the active state to the suspended state in a port connection state machine by replacing a condition "!rx_ok" with a condition "(!do_standby && !rx_ok)" in a port connection state machine, where "!" represents a logical complement and "&&" represents a logical AND function.

14. A method of transitioning a port in a communication system from an active state to a standby state, the method comprising the steps of:
    transmitting a signal to transition the port to the standby state;
    upon transmission of the signal to transition the port to the standby state, transitioning the port from the active state to the standby state without entering a suspended state; and
    ensuring that the standby state is entered regardless of a value of a variable "rx_ok."

15. The method of claim 14, wherein the ensuring step comprises the step of modifying a logical expression governing a transition of the port from the active state to the standby state in a port connection state machine.

16. A device for use in a communication system, the device comprising:
    at least a first port;
    memory; and
    at least one processor coupled to the memory and to the at least first port, the at least one processor being configured: to cause the at least first port to transmit a signal to transition at least a second port to a standby state from an active state; and, upon transmission of the signal to transition the at least second port from the active state to the standby state, to ensure that the at least first port transitions from the active state into the standby state without entering a suspended state.

17. The device of claim 16, wherein the device is implemented as an integrated circuit.

18. The device of claim 16, wherein the port is a physical layer interface port.

19. The device of claim 16, wherein the device is configurable for communication using an IEEE 1394 compliant communications protocol.

20. The device of claim 16, wherein the at least one processor comprises a digital signal processor.

21. The device of claim 16, wherein the device comprises at least one of a digital camera, a digital camcorder, a personal digital assistant (PDA), a Moving Picture Experts Group Layer-3 audio (MP3) device, a cellular phone, a personal computer, a printer, a frame grabber, an external hard drive, a scanner and a networking hub.

22. A device for use in a communication system, the device comprising:
    at least a first port;
    memory; and
    at least one processor coupled to the memory and to the at least first port, the at least one processor being configured: to cause the at least first port to transmit a signal to transition at least a second port to a standby state from an active state; and, upon transmission of the signal to transition the at least second port from the active state to the standby state, to transition the at least first port from the active state into the standby state without entering a suspended state;
    wherein the at least one processor is operative to transition the at least first port from the active state to the standby state without evaluating a variable "rx_ok."

23. A device for use in a communication system, the device comprising:
    at least a first port;
    memory; and
    at least one processor coupled to the memory and to the at least first port, the at least one processor being configured: to cause the at least first port to transmit a signal to transition at least a second port to a standby state from an active state; and, upon transmission of the signal to transition the at least second port from the active state to the standby state, to transition the at least first port from the active state into the standby state without entering a suspended state;

wherein the at least one processor is operative to implement a transition of the at least first port from the active state to the standby state in accordance with a condition (do_standby && signaled && !force_disconnect), where "&&" represents a logical AND function, "!" represents a logical complement, and "do_standby," "signaled," and "force_disconnect" are variables used in implementing a port connection state machine.

24. A data communication system, comprising:

at least one port adapted for at least one of transmitting data to at least one other port and receiving data from the at least one other port; and at least one controller coupled to the port, the controller being operative to ensure that the at least one port transitions from an active state to a standby state without entering a suspended state.

25. The system of claim 24, wherein the at least one port comprises a physical layer interface port.

26. The system of claim 24, wherein the at least one port is configurable for communication using an IEEE 1394 compliant communications protocol.

27. The system of claim 24, wherein the data communication system comprises at least one of a video editing system, a multimedia broadcast system and a networking system.

* * * * *